United States Patent
Isshiki

(10) Patent No.: US 10,955,018 B2
(45) Date of Patent: Mar. 23, 2021

(54) BRAKE PAD ASSEMBLY AND CALIPER

(71) Applicant: ADVICS CO., LTD., Kariya (JP)

(72) Inventor: Tadashi Isshiki, Kariya (JP)

(73) Assignee: ADVICS CO., LTD., Kariya (JP)

( * ) Notice: Subject to any disclaimer, the term of this patent is extended or adjusted under 35 U.S.C. 154(b) by 28 days.

(21) Appl. No.: 16/470,829

(22) PCT Filed: Dec. 21, 2017

(86) PCT No.: PCT/JP2017/045999
§ 371 (c)(1),
(2) Date: Jun. 18, 2019

(87) PCT Pub. No.: WO2018/117234
PCT Pub. Date: Jun. 28, 2018

(65) Prior Publication Data
US 2019/0309813 A1    Oct. 10, 2019

(30) Foreign Application Priority Data

Dec. 22, 2016    (JP) ............................. JP2016-250024

(51) Int. Cl.
*F16D 66/02*    (2006.01)
*F16B 2/24*    (2006.01)
(Continued)

(52) U.S. Cl.
CPC .............. *F16D 66/021* (2013.01); *F16B 2/24* (2013.01); *F16D 55/22* (2013.01); *F16D 65/02* (2013.01);
(Continued)

(58) Field of Classification Search
CPC ...... F16D 66/024; F16D 66/02; F16D 66/022; F16D 2055/0041; F16D 2065/1396;
(Continued)

(56) References Cited

U.S. PATENT DOCUMENTS 3,977,499 A * 8/1976 Johannesen ......... F16D 55/2262
                                                    188/73.38
4,183,012 A * 1/1980 Kimura ................. F16D 66/024
                                                    188/1.11 L
(Continued)

FOREIGN PATENT DOCUMENTS

CN    102853010 A1    1/2013
EP        2182236 A1 *  5/2010 ........... F16D 66/024
(Continued)

OTHER PUBLICATIONS

English translation of JP 2016194367A (Year: 2016).*
(Continued)

*Primary Examiner* — Bradley T King
*Assistant Examiner* — Mahbubur Rashid
(74) *Attorney, Agent, or Firm* — Buchanan Ingersoll & Rooney PC

(57) ABSTRACT

This brake pad assembly is, for example, equipped with: a brake pad that includes a lining and a back plate; a detection unit attached to the plate and detects abrasion of the lining; and a retainer for attaching the unit to the plate in a detachable manner. The retainer has: a base part that contacts a surface of the plate; a first holding part that holds the retainer in a prescribed position on the plate; a second holding part provided so as to be movable between a restricting position in which the unit is restricted from separating from the plate, and a release position in which the unit can be detached from the plate; a biasing part that elastically biases the second holding part toward the restricting position; and an operation part that moves the second holding part to the release position by means of an applied external force.

6 Claims, 10 Drawing Sheets

(51) Int. Cl.
*F16D 55/22* (2006.01)
*F16D 65/092* (2006.01)
*F16D 65/02* (2006.01)
*F16D 65/00* (2006.01)
*F16D 55/00* (2006.01)

(52) U.S. Cl.
CPC ............ *F16D 65/092* (2013.01); *F16D 66/02* (2013.01); *F16D 65/0068* (2013.01); *F16D 2055/0016* (2013.01)

(58) Field of Classification Search
CPC ............... F16D 2121/04; F16D 55/226; F16D 65/0972; F16D 65/092; F16D 65/095; F16D 65/22; F16D 65/0006; F16D 65/0978; F16D 65/0977; F16B 2/24
See application file for complete search history.

(56) References Cited

U.S. PATENT DOCUMENTS

| | | | | |
|---|---|---|---|---|
| 4,344,509 | A * | 8/1982 | Harmer | F16D 66/024 116/208 |
| 5,839,545 | A * | 11/1998 | Preston | F16D 66/024 188/1.11 L |
| 6,206,158 | B1 * | 3/2001 | Muller | F16D 13/58 116/208 |
| 6,290,027 | B1 * | 9/2001 | Matsuzaki | F16D 66/024 188/1.11 E |
| 9,045,122 | B2 * | 6/2015 | Bosis | F16D 66/024 |
| 9,657,793 | B2 * | 5/2017 | Sander | F16D 65/0976 |
| 2002/0060109 | A1 * | 5/2002 | Fujiwara | F16D 66/02 188/1.11 W |
| 2005/0077122 | A1 * | 4/2005 | Harris | F16D 66/021 188/71.1 |
| 2013/0001024 | A1 | 1/2013 | Odaira et al. | |
| 2018/0112732 | A1 | 4/2018 | Arakane | |
| 2018/0283482 | A1 * | 10/2018 | Pahle | F16D 66/02 |

FOREIGN PATENT DOCUMENTS

| | | | | |
|---|---|---|---|---|
| GB | 2042109 | A * | 9/1980 | ............ F16D 65/08 |
| JP | S50-4151 | U | 1/1975 | |
| JP | S5865495 | U | 5/1983 | |
| JP | S59-9158 | U | 1/1984 | |
| JP | H07-012156 | A | 1/1995 | |
| JP | H11264427 | A | 9/1999 | |
| JP | 2000145730 | A | 5/2000 | |
| JP | 2002367495 | A | 12/2002 | |
| JP | 2016194367 | A | 11/2016 | |

OTHER PUBLICATIONS

International Search Report (PCT/ISA/210) dated Mar. 13, 2018, by the Japan Patent Office as the International Searching Authority for International Application No. PCT/JP2017/045999.

Written Opinion (PCT/ISA/237) dated Mar. 13, 2018, by the Japan Patent Office as the International Searching Authority for International Application No. PCT/JP2017/045999.

Notification of Transmittal of Translation of the International Preliminary Report on Patentability (Form PCT/IB/338 and PCT/IB/373) dated Jul. 4, 2019 and the Written Opinion of the International Searching Authority (Form PCT/ISA/237) dated Mar. 13, 2018, by the International Bureau of WIPO in corresponding International Application No. PCT/JP2017/045999. (9 pages).

* cited by examiner

BRAKE PAD ASSEMBLY AND CALIPER

TECHNICAL FIELD

The present invention relates to a brake pad assembly and a caliper.

BACKGROUND ART

Conventionally, a brake pad assembly is known, in which a detection unit of a pad wear indicator for detecting wear of a lining is attached to a brake pad (e.g., see PTL 1).

CITATION LIST

Patent Literature

PTL 1: JP-A-11-264427

SUMMARY OF INVENTION

Technical Problem

In the conventional configuration, in which the detection unit of the pad wear indicator is provided on the brake pad in a caliper of a disc brake, when the detection unit is removed, operations are performed, for example, in the following order: First, a connector fixed to a harness of the detection unit is removed from a connector fixed to a harness provided on a vehicle. Then, the caliper is removed from the vehicle. Then, the brake pad is removed from the caliper. Finally, the detection unit is removed from the brake pad.

However, the operation of removing the connector may take a longtime in order to prevent dust from entering between the connectors. As a countermeasure, if the detection unit can be more easily removed from a back plate, the caliper may be able to be removed from the vehicle without removing the connector.

Accordingly, one of objects of the present invention is, for example, to obtain a brake pad assembly and a caliper, which allow a detection unit for detecting wear of a lining to be more easily attached to or detached from a back plate.

Solution to Problem

A brake pad assembly of the present invention includes, for example, a brake pad including a lining configured to come in contact with a slide surface of a disk rotor and a back plate having a first surface and a second surface opposite to the first surface, wherein the lining is fixed on the first surface; a detection unit attached to the back plate and configured to detect wear of the lining; and a retainer configured to detachably attach the detection unit to the back plate, wherein the retainer includes: a base portion in contact with the second surface; a first holding portion for holding the retainer at a predetermined position on the back plate; a second holding portion provided to be movable between a restricting position, at which the detection unit is restricted from being separated from the back plate, and a release position, at which the detection unit can be attached to or detached from the back plate; an urging portion for elastically urging the second holding portion from the release position toward the restricting position; and an operating portion configured to be moved by an external force applied thereon and thus to move the second holding portion from the restricting position to the release position.

In the brake pad assembly, the detection unit is allowed to be attached to or detached from the back plate by moving the second holding portion from the restricting position to the release position in a state where the retainer is held at the predetermined position on the back plate. This configuration, for example, allows an operator to more easily attach or detach the detection unit to or from the back plate in a state where the retainer is attached to the back plate.

Also, in the brake fad assembly, for example, the retainer has an elastically deformable movable arm that protrudes from one end portion of the base portion, has the second holding portion and the operating portion, and is configured to function as the urging portion, wherein the movable arm has an extension portion positioned spaced from the second surface and extending toward the other end portion of the base portion along the base portion.

This configuration, for example, can make the movable arm longer, which can make it easy to inhibit an increase in the local stress on the movable arm subject to elastic deformation.

Further, in the brake fad assembly, for example, the movable arm has a bridge portion configured to cross the other end portion of the base portion in a thickness direction of the back plate and spaced from the other end portion.

This configuration, for example, can make the movable arm longer, which can make it easy to inhibit an increase in the local stress on the movable arm subject to elastic deformation.

Further, in the brake fad assembly, for example, the base portion has a stopper for restricting movement of the movable arm by abutting against the bridge portion moving in accordance with movement of the movable arm.

This configuration, for example, can prevent an excessive movement of the movable arm subject to elastic deformation, which can make it easy to inhibit an increase in the local stress on the movable arm.

Further, in the brake fad assembly, for example, a part of an edge of a first opening portion provided in the bridge portion is an abutting portion configured to abut against the stopper.

According to this configuration, for example, the abutting portion can be made using a relatively simple configuration. In addition, for example, the stopper and the abutting portion are less likely to be displaced from each other, as compared with a case where the abutting portion is provided along a surface of the movable arm or the bridge portion. Therefore, the effect of the stopper can be obtained more reliably.

Further, in the brake fad assembly, for example, the bridge portion has a pressure receiving portion configured to come in contact with the detection unit moving toward amounting position thereof on the back plate while the second holding portion is positioned at the restricting position and thereby to move the movable arm so that the second holding portion is moved from the restricting position to the release position.

This configuration, for example, allows the operator to more easily mount the detection unit onto the back plate by bringing the detection unit close to the mounting position so that the second holding portion is moved from the restricting position to the release position.

In addition, a caliper of the present invention includes, for example, the brake pad assembly as described above; a support member provided with a second opening portion and configured to movably support the brake pad, wherein the operating portion is provided to be operated via the second opening portion, and the detection unit is provided to be attached or detached via the second opening portion.

This configuration, for example, allows the operator to more easily attach or detach the detection unit to or from the back plate via the second opening of the caliper.

DESCRIPTION OF EMBODIMENTS

Hereinafter, exemplary embodiments of the present invention are disclosed. Configurations of the embodiments described below and thus the operation and results (effects) obtained from the configurations are only examples. The present invention can also be realized with configurations other than configurations disclosed in the following embodiments. Further, according to the present invention, it is possible to obtain at least one of various effects (including derivative effects) obtained by the configurations.

In each of the figures, arrows indicating directions are shown for convenience of explanation. A direction A is an axial direction of the rotational center of a wheel and extend outward in a vehicle width direction, a direction C is a circumferential direction (i.e., one direction thereof) with respect to the rotational center of the wheel, and a direction R extends outward in a radial direction with respect to the rotational center of the wheel. Also, in the following, the axial direction of the rotational center of the wheel can also be referred to simply as the axial direction, the circumferential direction with respect to the rotational center of the wheel can also be referred to simply as the circumferential direction, and the radial direction with respect to the rotational center of the wheel can also be referred to simply as the radial direction.

(Configuration of Caliper)

Figure 1:
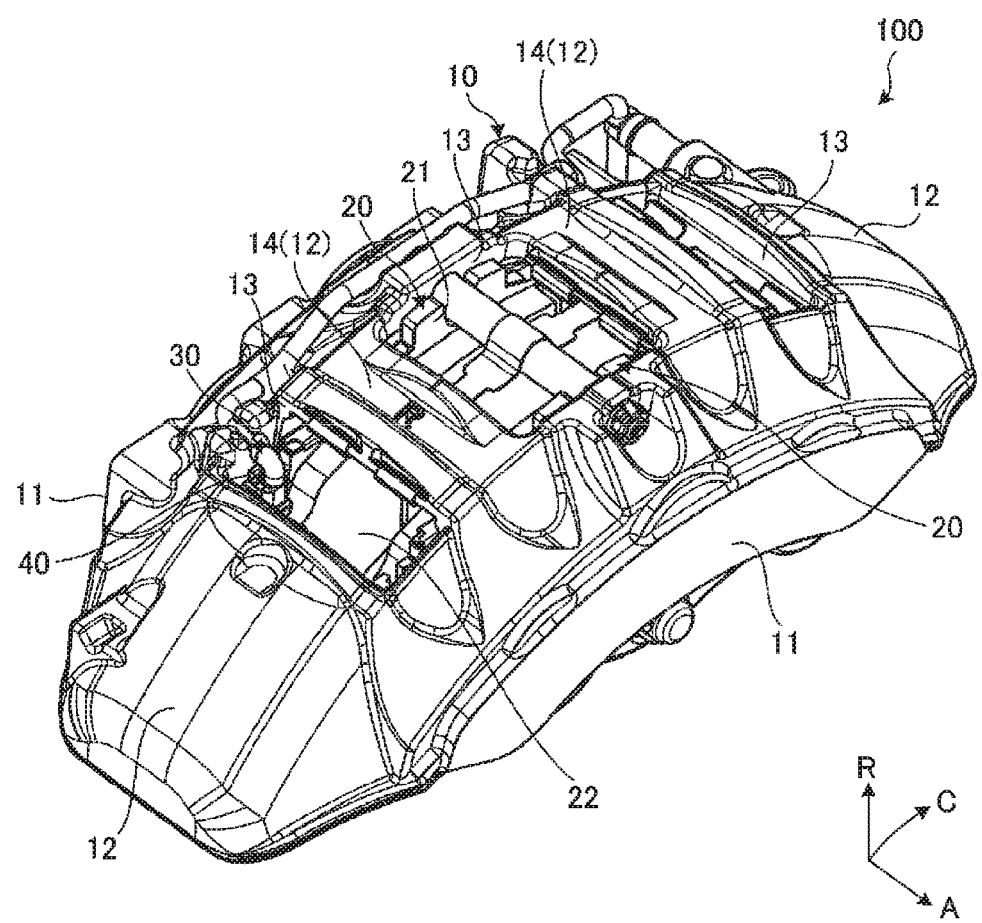
FIG. 1 is a schematic and exemplary perspective view of a caliper according to an embodiment.

FIG. 1 is a perspective view of a caliper 100 of a vehicle brake. As shown in FIG. 1, the caliper 100 has a body 10. The body 10 axially movably supports two brake pads 20. Also, the body 10 has a wheel cylinder (not shown) fixed thereon. The wheel cylinder movably receives a piston for pressing the brake pads 20 against a disk rotor (not shown). Due to operation of the piston, the two brake pads 20 are pressed against the disk rotor to sandwich the disk rotor from both sides in the vehicle width direction. The disk rotor is braked by friction between the disk rotor and the two brake pads 20 pressed thereagainst, and as a result, a vehicle is decelerated. The body 10 is an example of the support member.

The body 10 has two side walls 11 positioned spaced from each other in the axial direction (vehicle width direction), and a circumferential wall 12 covering the disc rotor from the outside in the radial direction with a gap interposed therebetween and also connecting the two side walls 11. The circumferential wall 12 is provided with a plurality of opening portions 13 spaced from each other in the circumferential direction. Parts of the circumferential wall 12, which are arranged between the plurality of opening portions 13, can also be referred to as bridges 14.

Figure 2:
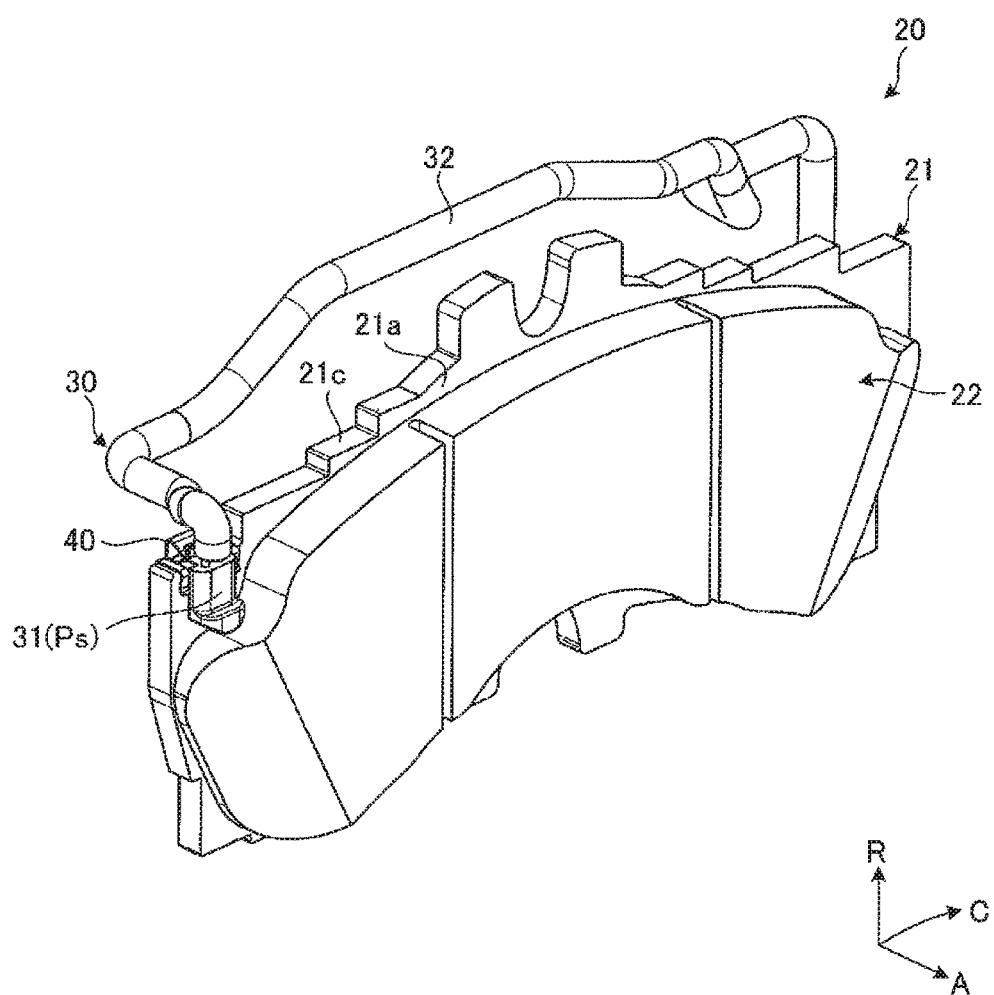
FIG. 2 is a schematic and exemplary perspective view of a brake pad according to the embodiment, as viewed from the side of a lining.
Figure 3:
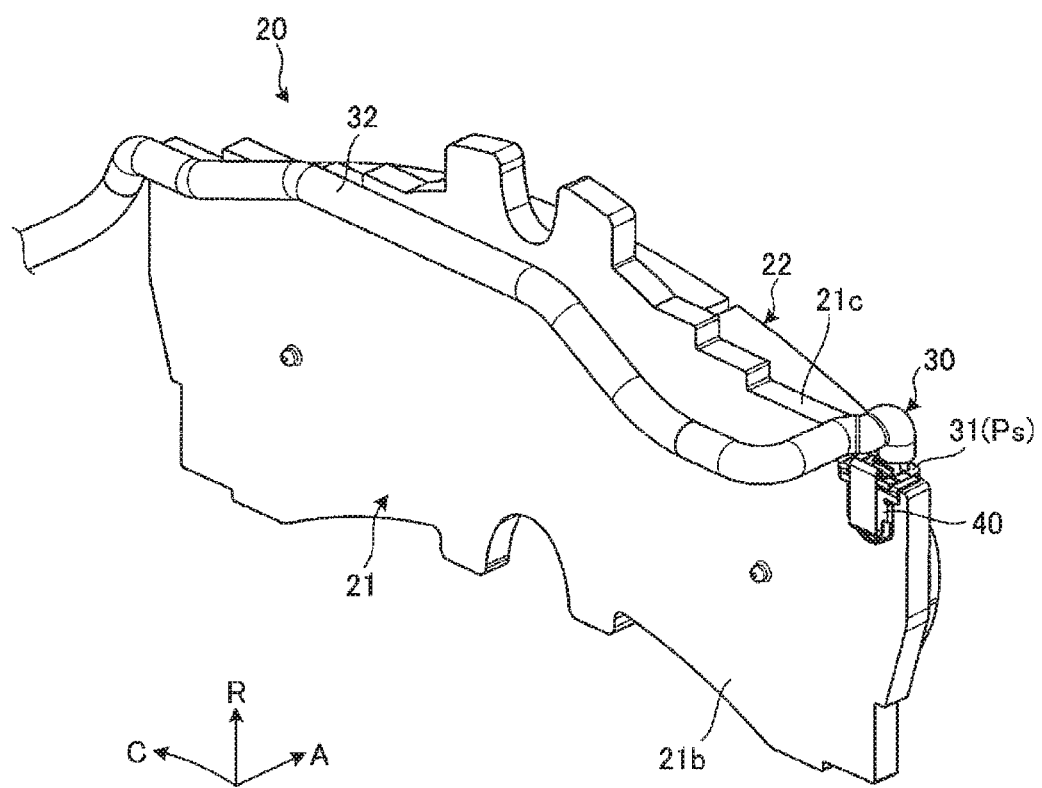
FIG. 3 is a schematic and exemplary perspective view of the brake pad according to the embodiment, as viewed from the side of a back plate.
Figure 4:
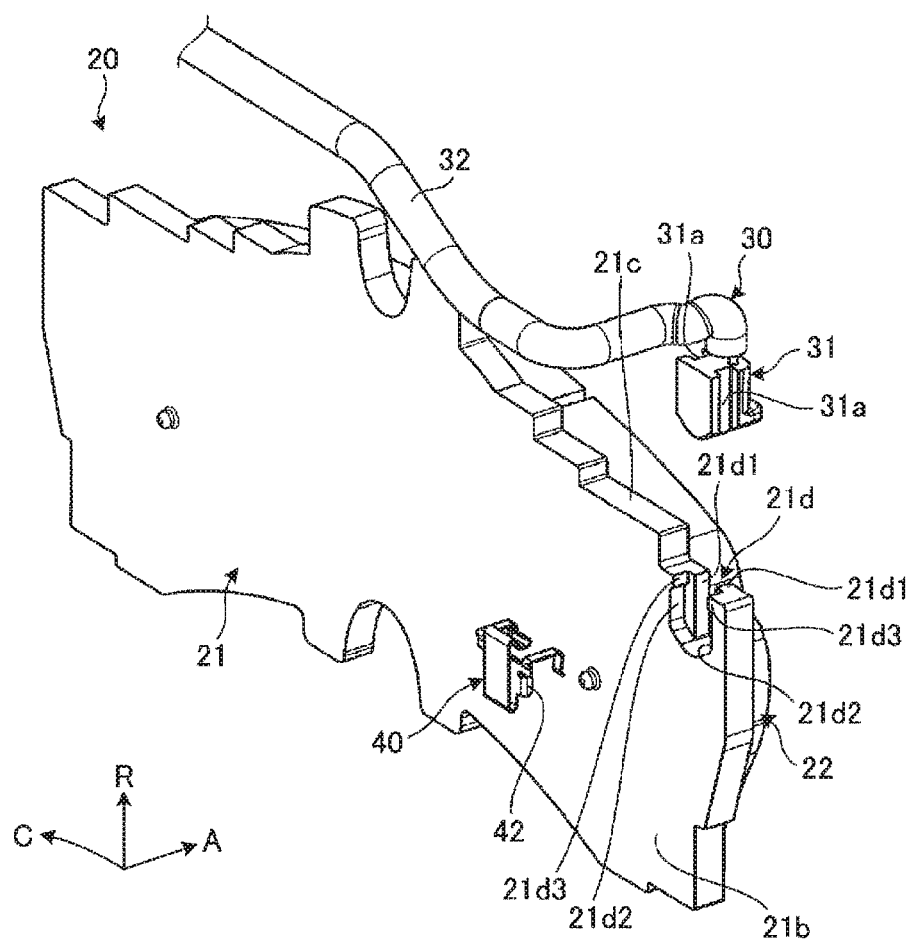
FIG. 4 is a schematic and exemplary exploded perspective view of the brake pad according to the embodiment, as viewed from the side of the back plate.

FIG. 2 is a perspective view of the brake pad 20 having a sensor 30 attached thereon, as viewed from the side of a lining 22, FIG. 3 is a perspective view of the brake pad 20 of FIG. 2, as viewed from the side of a back plate 21, and FIG. 4 is an exploded perspective view of the brake pad 20 of FIG. 2, as viewed from the side of the back plate 21. As shown in FIGS. 2 and 3, the brake pad 20 has the back plate 21 and the lining 22.

A shape of the back plate 21 has a shape of a plate having a substantially constant thickness and extending in a direction intersecting with the axial direction. The back plate 21 has a first surface 21a facing the disk rotor, a second surface 21b opposite to the first surface 21a, and a third surface 21c extending between the first surface 21a and the second surface 21b. The third surface 21c is a side surface of the back plate 21, which is arranged on the outside in the radial direction.

A shape of the lining 22 has a shape of a plate having a substantially constant thickness, except both end portions thereof in the circumferential direction, and extending in a direction intersecting with the axial direction. The lining 22 is fixed on the first surface 21a in a posture where the lining 22 extends along the first surface 21a.

The sensor 30 is configured to detect wear of the lining 22. The sensor 30 has a probe 31 and a harness 32. The probe 31 is configured to detect a state where the lining 22 has been worn away by a predetermined amount. The harness 32 is configured to electrically connect a detection unit (not shown) provided in the probe 31 with an ECU (not shown). A detected signal in the detection unit of the probe 31 is sent to the ECU via the harness 32, and thus the ECU can detect that the lining 22 has been worn away by the predetermined amount. The probe 31 can be configured as various types of probes 31, such as a type contactlessly detecting a distance from the disk rotor or a type having a part which is to be broken due to friction with the disk rotor. The probe 31 is an example of the detection unit.

As shown in FIG. 4, the third surface 21c of the back plate 21 is provided with a notch 21d used for attaching the probe 31 thereon. The notch 21*d* is configured to extend through the first surface 21*a* and the second surface 21*b* and also to be opened outward in the radial direction. The probe 31 is inserted into the notch 21*d* from the outside toward the inside in the radial direction by an operator and thus is positioned at a position where the notch 21*d* is plugged up, i.e., at a mounting position Ps (see FIGS. 2 and 3).

As shown in FIG. 4, the back plate 21 and the probe 31 are respectively provided with guide structures 21*d*1, 31*a* along the radial direction. As an example, the guide structure 21*d*1 provided on the back plate 21 is ridges provided on a pair of edges of the notch 21*d* to oppose each other and to extend in the radial direction along the respective edges, and the guide structure 31*a* provided on the probe 31 is recess grooves extending along respective side surfaces of a body of the probe 31. However, the guide structures 21*d*1, 31*a* are not limited to them. The probe 31 is moved to the mounting position Ps inward in the radial direction while being guided along the guide structure 21*d*1, 31*a*.

The probe 31 is fixed on the back plate 21 via a retainer 40 fixed on the back plate 21. In the present embodiment, the back plate 21, the probe 31 and the retainer 40 can be configured to detachably attach the probe 31 on the back plate 21 in a state where the retainer 40 is fixed on the back plate 21.

Figure 5:
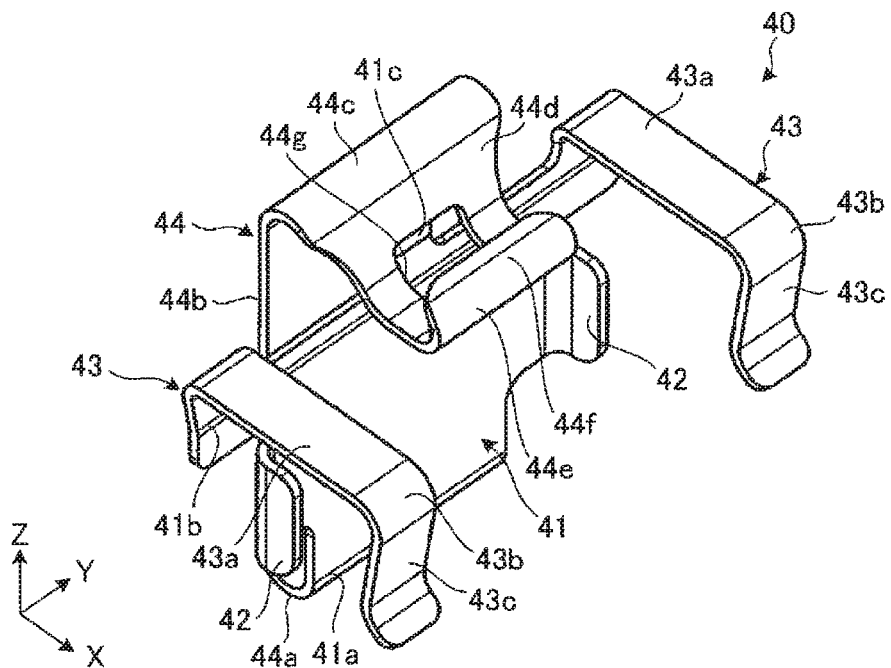
FIG. 5 is a schematic and exemplary perspective view of a retainer according to the embodiment.
Figure 6:
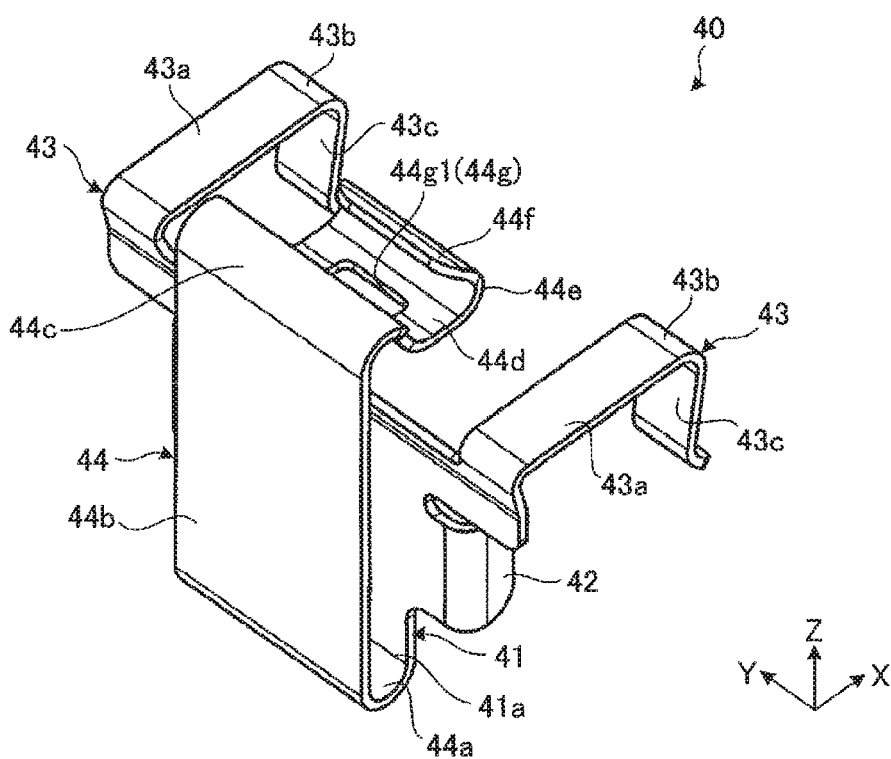
FIG. 6 is a schematic and exemplary perspective view of the retainer according to the embodiment, as viewed at an angle different from that in FIG. 5.
Figure 7:
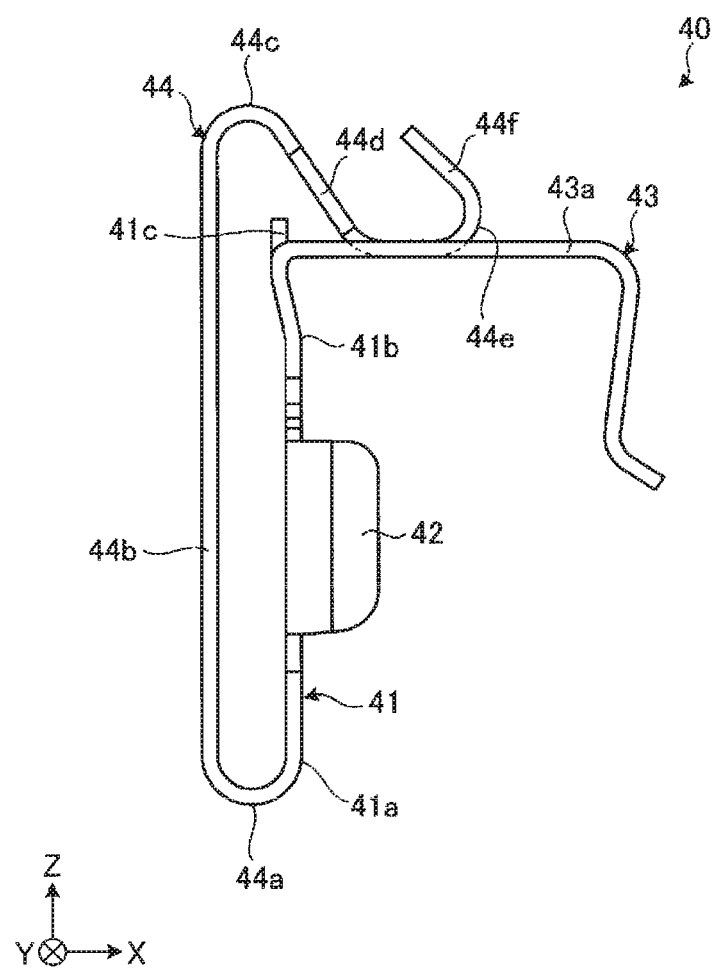
FIG. 7 is a schematic and exemplary side view of the retainer according to the embodiment.

FIG. 5 is a perspective view of the retainer 40, FIG. 6 is a perspective view of the retainer 40 as viewed at a different angle, and FIG. 7 is a side view of the retainer 40. Meanwhile, in the figures after FIG. 5, arrows indicating directions in the attached state of the retainer 40 to the back plate 21 are shown for convenience of explanation. A direction X corresponds to the axial direction and also a thickness direction of the back plate 21, and is a direction approaching the disk rotor. Also, a direction Y is a direction perpendicular to the direction X and extending along the third surface 21*c* of the back plate 21, and a direction Z is a normal direction to the third surface 21*c*. The direction X, the direction Y and the direction Z are perpendicular to each other.

As shown in FIGS. 5 to 7, the retainer 40 includes a base portion 41, two claws 42 protruding from the base portion 41, two hooked arms 43 protruding the base portion 41 and one movable arm 44 protruding from the base portion 41. The retainer 40 can be formed, for example, by pressing or bending a plate-shape metal material (e.g., spring steel).

The base portion 41 has a flat plate shape and is configured to be perpendicular to the direction X and also to extend along the direction Y and the direction Z. The base portion 41 includes an end portion 41*a* on a rear side in the direction Z (lower side in FIGS. 5 to 7) and an end portion 41*b* on a front side in the direction Z (upper side in FIGS. 5 to 7). The end portion 41*a* is an example of one end portion and the end portion 41*b* is an example of the other end portion.

The two claws 42 protrude, respectively, from the middle position, in the direction Z, of each of both end portions, in the direction Y, of the base portion 41 to a front side in the direction X (right side in FIG. 7). The claws 42 intersect with the base portion 41 and also are perpendicular to the base portion 41. Also, each of the claws 42 extends along the direction Y and the direction Z. The claws 42 can also be referred to as protrusions.

The two hooked arms 43 having a band shape protrude, respectively, from an end portion, on the front side in the direction Z, of each of both end portions, in the direction Y, of the base portion 41 to the front side in the direction X. Also, distal ends of the hooked arms 43 are bent toward the rear side in the direction Z. That is, the hooked arms 43 include a bridge arm portion 43*a*, a bent portion 43*b* and an opposing portion 43*c*. The bridge arm portion 43*a* extends between a connection part to the base portion 41 and the bent portion 43*b* generally along the direction X. The opposing portion 43*c* extends from the bent portion 43*b* to the distal end generally along the direction Z. A width of the hooked arms 43 is substantially constant from the connection part thereof to the base portion 41 to the distal end.

The one movable arm 44 having a band shape protrudes from the middle position, in the direction Y, of the end portion, on the rear side in the direction Z (lower side in FIGS. 5 to 7), of the base portion 41 toward the rear side in the direction Z, and also extends by way of a U-shaped bent part and then toward the front side in the direction Z (upper side in FIGS. 5 to 7) while being spaced from the base portion 41 toward the rear side in the direction X (left side in FIG. 7). Also, the movable arm 44 protrudes to the front side in the direction X (right side in FIG. 7) at an end portion thereof on the front side in the direction Z while being bent in a generally S shape. That is, the movable arm 44 includes a first bent portion 44*a*, an extension portion 44*b*, a second bent portion 44*c*, a bridge portion 44*d*, a third bent portion 44*e* and a folded-back portion 44*f*. The first bent portion 44*a* protrudes from the end portion 41*a* to the rear side in the direction Z and has a part positioned more toward the rear side in the direction Z than the base portion 41. The extension portion 44*b* extends between the first bent portion 44*a* and the second bent portion 44*c* generally along the direction Z. The second bent portion 44*c* has a part positioned more toward the front side in the direction Z (upper side in FIGS. 5 to 7) than the end portion 41*b*. The bridge portion 44*d* extends from the second bent portion 44*c* to the third bent portion 44*e* toward the lower side in the direction Z and also the front side in the direction X. The folded-back portion 44*f* extends from the third bent portion 44*e* to the distal end toward the front side in the direction Z and also the rear side in the direction X. A width of the movable arm 44 is substantially constant between the first bent portion 44*a* and the second bent portion 44*c*, gradually narrows from the second bent portion 44*c* to a halfway position, and then keeps the narrowed width substantially constant from the halfway position to the distal end.

Figure 8:
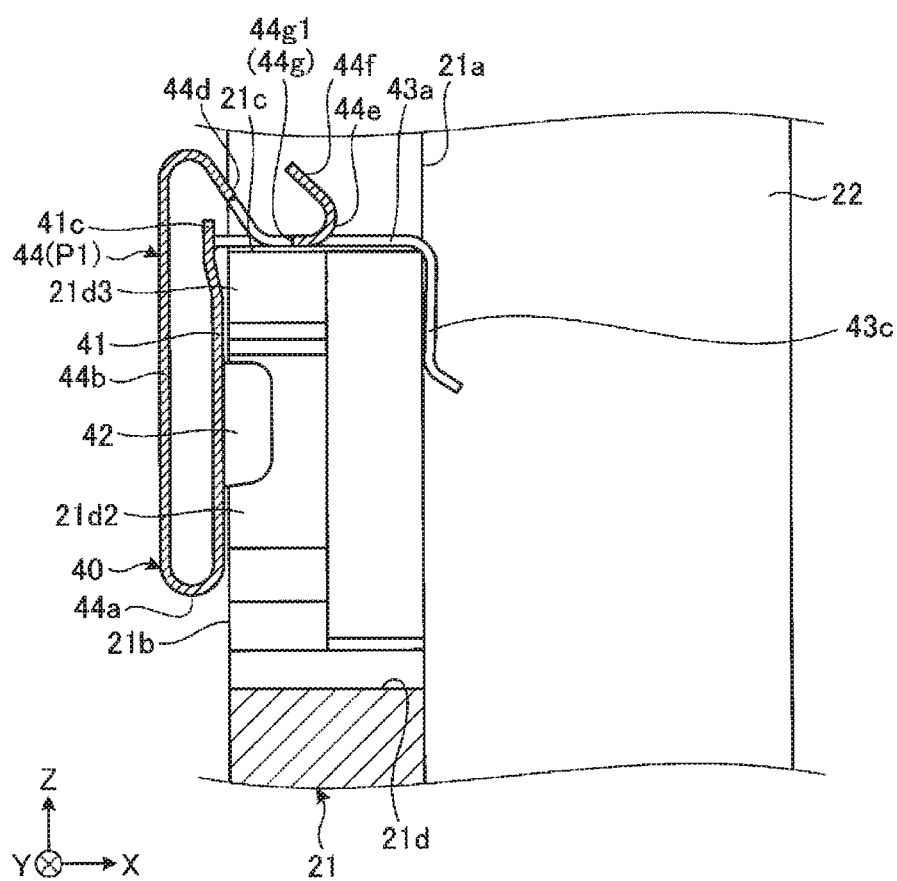
FIG. 8 is a schematic and exemplary sectional view containing the brake pad, the retainer and a probe according to the embodiment, illustrating a state where the retainer has been attached to the brake pad, but the probe is not mounted on the brake pad.

FIG. 8 is a sectional view of the back plate 21 and the retainer 40 in the attached state of the retainer 40 to the back plate 21. As shown in FIG. 8, the retainer 40 is attached to an end portion, on the front side in the direction Z, of the back plate 21 (upper end portion of the back plate 21 in FIG. 8) in such a manner that the retainer 40 straddles the back plate 21 in the direction X. That is, in the attached state of the retainer 40 to the back plate 21, the base portion 41 is arranged along the second surface 21*b* of the back plate 21, the bridge arm portions 43*a* of the hooked arms 43 are arranged along the third surface 21*c* of the back plate 21, and the opposing portions 43*c* of the hooked arms 43 are arranged along the first surface 21*a* of the back plate 21. Also, the claws 42 are arranged along the respective side surfaces 21*d*2 of the notch 21*d* and also are positioned more toward the rear side in the direction Z (lower side in FIGS. 4 and 8) than protrusions 21*d*3 (see FIG. 4), which protrude from the opening end of the notch 21*d* to approach each other.

In this configuration, interference between the claws 42 and the side surfaces 21*d*2 inhibits the retainer 40 from moving in the direction Y, interference between the claws 42 and the protrusions 21*d*3 inhibits the retainer 40 from moving to the front side in the direction Z (upper side in FIGS. 4 and 8), and interference between the bridge arm portions 43*a* and the third surface 21*c* inhibits the retainer 40 from moving to the rear side in the direction Z (lower side in FIG. 8). Also, since the base portion 41 and the opposing portions 43c elastically sandwich the back plate 21 therebetween, the retainer 40 is inhibited from moving in the direction X. Therefore, the claws 42 and the bridge arm portions 43a are an example of the first holding portion for holding the retainer 40 at an attaching position (predetermined position) thereof to the back plate 21.

Figure 9:
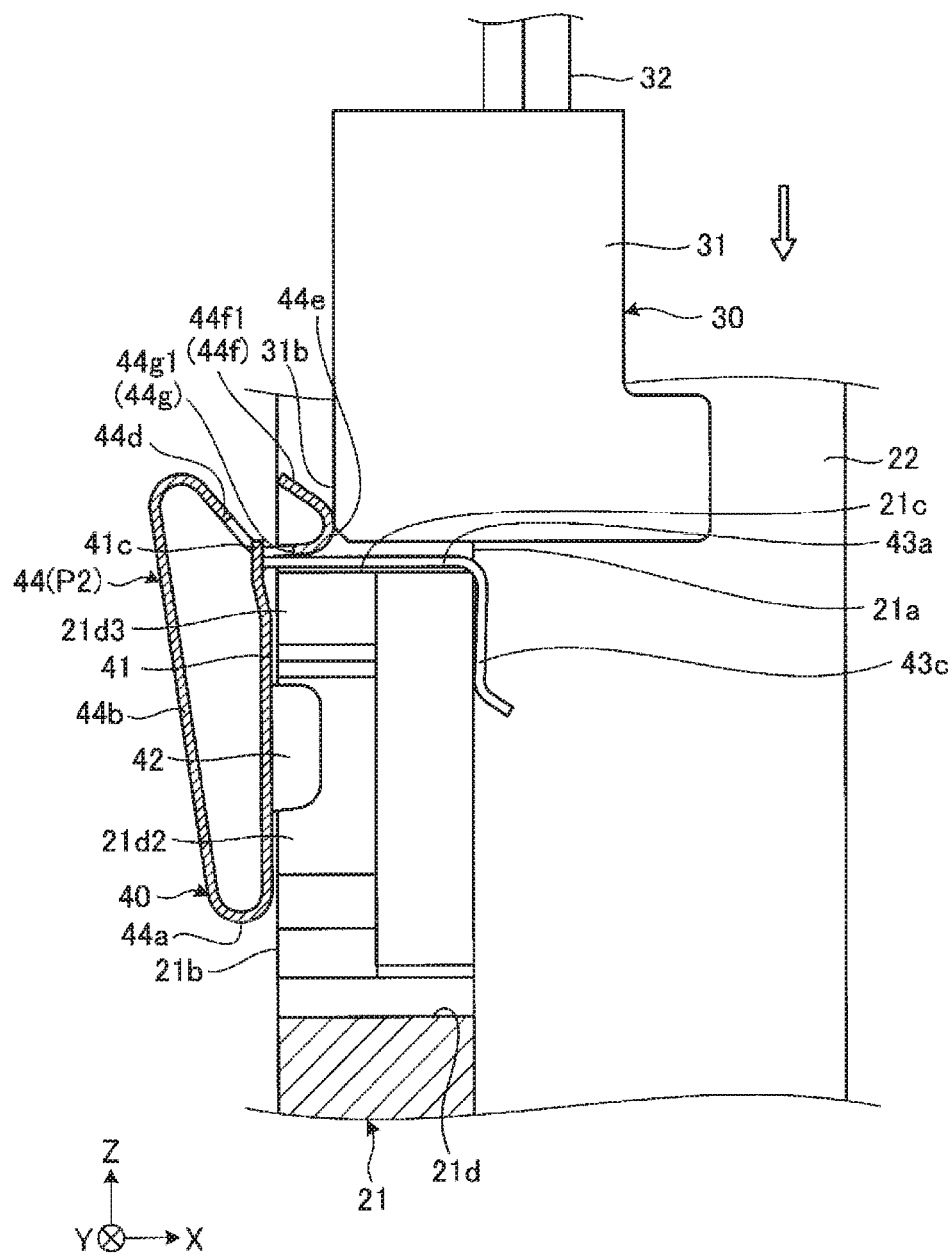
FIG. 9 is a schematic and exemplary sectional view containing the brake pad, the retainer and the probe according to the embodiment, illustrating a state where the retainer has been attached to the brake pad, and the probe is closer to a mounting position thereof than in FIG. 8.
Figure 10:
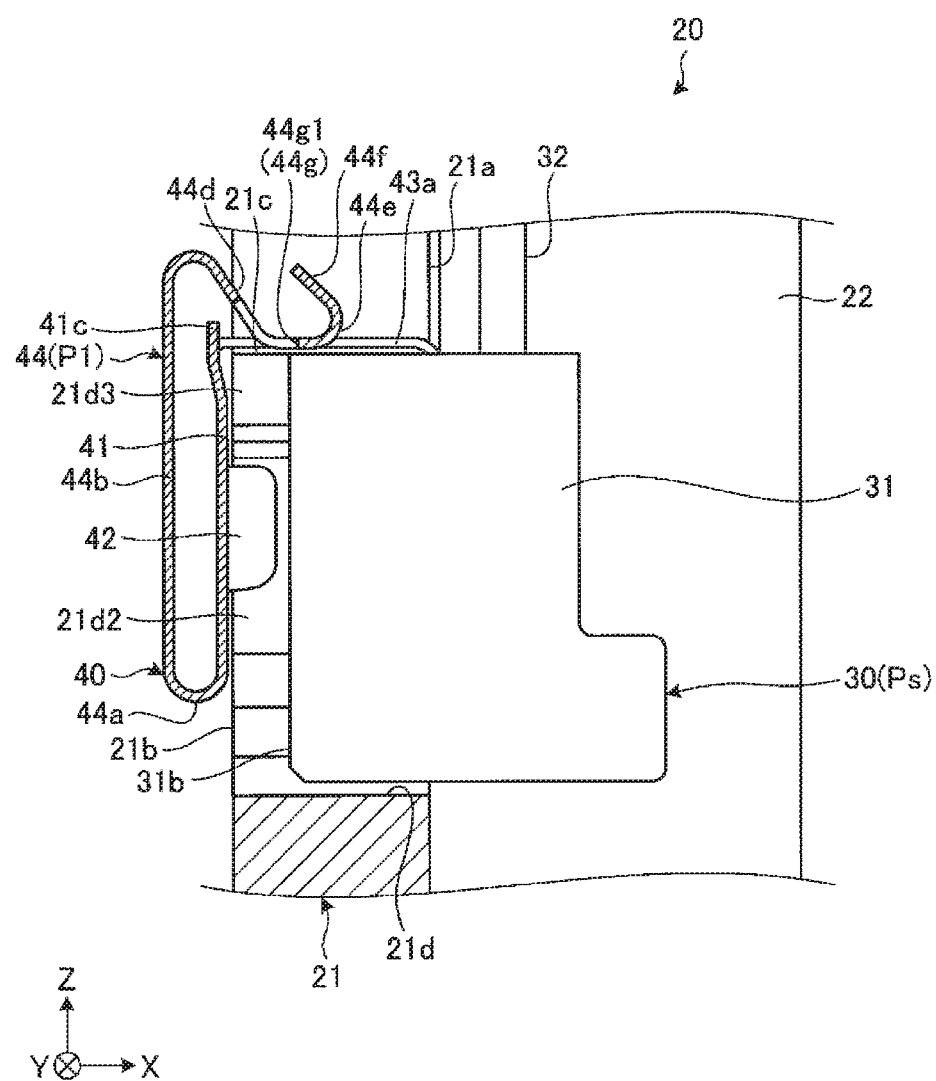
FIG. 10 is a schematic and exemplary sectional view containing the brake pad, the retainer and the probe according to the embodiment, illustrating a state where the retainer has been attached to the brake pad and also the probe has been mounted on the brake pad.

FIGS. 8 to 10 are views showing respective steps of mounting the probe 31 (sensor 30) in a state where the retainer 40 has been mounted on the back plate 21, in which FIG. 8 is a view showing a state where the probe 31 is spaced from the back plate 21, FIG. 9 is a view showing a state where the probe 31 is positioned closer to the mounting position Ps (see FIG. 10) thereof on the back plate 21 than in FIG. 8, and FIG. 10 is a view showing a state where the probe 31 is positioned at the mounting position Ps thereof on the back plate 21.

As shown in FIG. 9, if an operator causes the probe 31 to come closer to the mounting position Ps than in FIG. 8, an end portion 31b of the probe 31 pushes out the folded-back portion 44f and the third bent portion 44e of the movable arm 44, so that the movable arm 44 is elastically moved to the left side in FIG. 9. That is, the movable arm 44 is moved from a first position P1, as shown in FIG. 8, to a second position P2, as shown in FIG. 9. Further, if the operator causes the probe 31 to reach the mounting position Ps (see FIG. 10), the movable arm 44 elastically returns to the first position P1, as shown in FIG. 10, i.e., the first position P1 equal to that in FIG. 8, from the second position P2, as shown in FIG. 9. That is, the operator can mount the probe 31 onto the back plate 21 after attaching the retainer 40 to the back plate 21 and thus in a state where the retainer 40 has been attached to the back plate 21 before the probe 31.

As can be clearly seen from FIG. 10, the bridge portion 44d of the movable arm 44 restricts moving of the probe 31 to the front side in the direction Z (upper side in FIGS. 8 to 10), i.e., escaping of the probe 31 from the mounting position Ps, in the state where the probe 31 has been positioned at the mounting position Ps. Therefore, the bridge portion 44d is an example of the second holding portion, the first position P1 is an example of the restricting position, and the second position P2 is an example of the release position.

Further, as shown in FIGS. 8 to 10, the movable arm 44 can be elastically deformed between a state, as shown in FIGS. 8 and 10 and a state, as shown in FIG. 9. Due to a load which the folded-back portion 44f and the third bent portion 44e receive from the probe 31 moving toward the mounting position Ps (see FIG. 10), the movable arm 44 is elastically deformed into a state where an angle at the first bent portion 44a defined between the base portion 41 and the extension portion 44b is elastically widened as shown in FIG. 9. If the load is eliminated, the movable arm 44 returns to a state where the angle at the first bent portion 44a defined between the base portion 41 and the extension portion 44b is narrowed as shown in FIG. 10. That is, the movable arm 44 functions as a urging member for elastically urging the bridge portion 44d from the second position P2 to the first position P1, and the folded-back portion 44f and the third bent portion 44e function as a pressure receiving portion for receiving an external force and thus moving the bridge portion 44d from the first position P1 to the second position P2. A condition for making the folded-back portion 44f function as the pressure receiving portion is that a normal vector of a contact surface 44f1 of the folded-back portion 44f with the probe 31 has a component from the second position P2 toward the first position P1.

Also, as shown in FIG. 10, the extension portion 44b of the movable arm 44 is positioned spaced from the second surface 21b and extends from the end portion 41a toward the end portion 41b of the base portion 41. Further, the bridge portion 44d of the movable arm 44 is configured to cross the end portion 41b of the base portion 41 in the direction X (thickness direction of the back plate 21) while being spaced from the end portion 41b. That is, the movable arm 44 is configured to extend while being curved in order to bypass the base portion 41.

Figure 11:
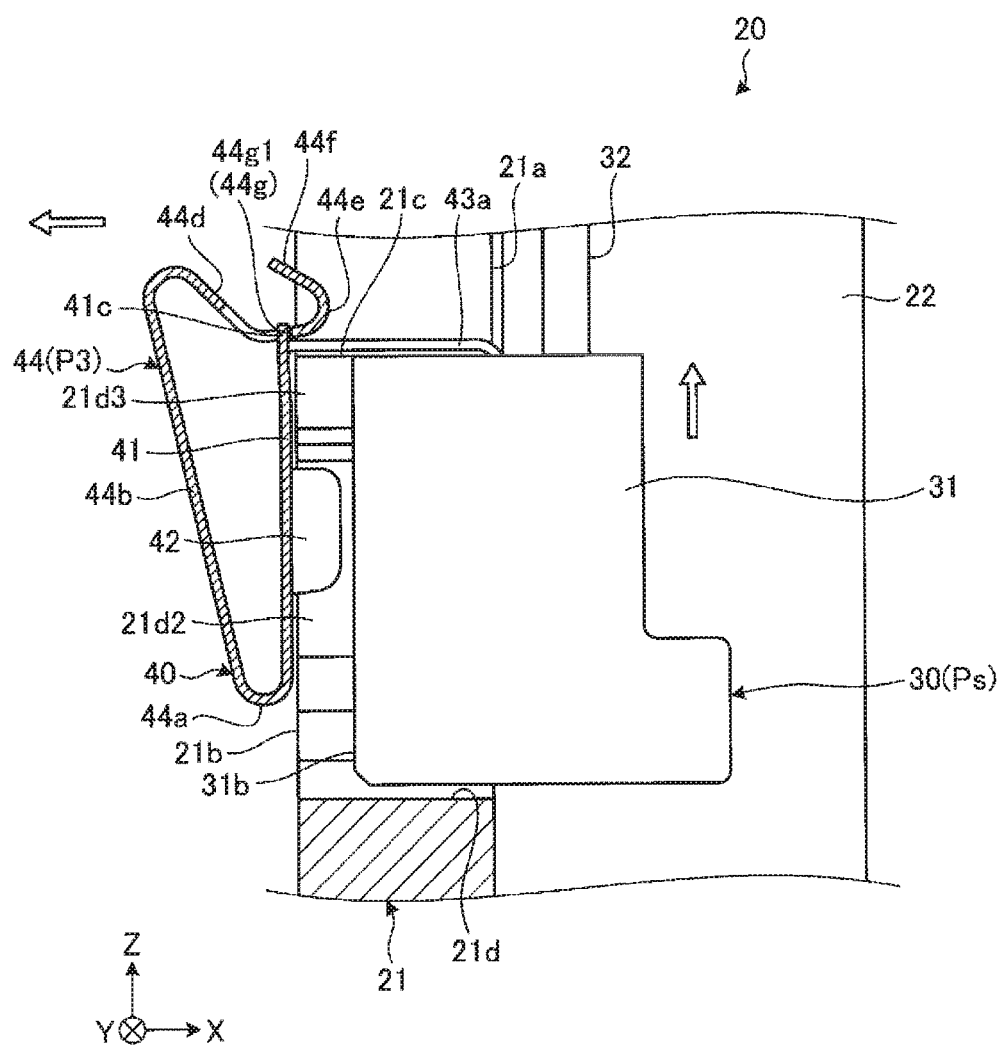
FIG. 11 is a schematic and exemplary sectional view containing the brake pad, the retainer and the probe according to the embodiment, illustrating a state where a movable arm of the retainer has been moved to a third position before the probe mounted on the brake pad is removed.

FIG. 11 is a view showing a state where the movable arm 44 of the retainer 40 is positioned at a third position P3 after the probe 31 has been mounted. The third position P3 is positioned more toward the rear side in the direction X (left side in FIG. 11) than the second position P2. The operator can move the probe 31 from the mounting position Ps to the front side in the direction Z (upper side in FIG. 11) by pushing the second bent portion 44c, the bridge portion 44d or the folded-back portion 44f to the rear side in the direction X and thus moving the movable arm 44 to the third position P3, and as a result, can remove the probe 31. That is, the operator can remove the probe 31 with the retainer 40 attached to the back plate 21 without removing the retainer 40 from the back plate 21. The second bent portion 44c, the bridge portion 44d, the third bent portion 44e or the folded-back portion 44f is an example of the operating portion.

Here, as shown in FIGS. 7 and 8, the end portion 41b of the base portion 41 is provided with a protrusion 41c protruding toward the front side in the direction Z (upper side in FIGS. 7 and 8). Also, as shown in FIGS. 5, 6, 8 and the like, the bridge portion 44d of the movable arm 44 is provided with an opening portion 44g. Further, as shown in FIG. 11, the protrusion 41c abuts against an edge 44g1, on the front side in the direction X (right side in FIG. 11), of the opening portion 44g in a state where the movable arm 44 is positioned at the third position P3. That is, since the protrusion 41c abuts against the edge 44g1 of the opening portion 44g, the movable arm 44 is restricted from moving more toward the rear side in the direction X (left side in FIG. 11) than the third position P3. The protrusion 41c is an example of the stopper, the opening portion 44g is an example of the first opening portion, and the edge 44g1 is an example of the abutting portion. Alternatively, the third position P3 can also be referred to as a restricting position or a limit position.

As described above, in the present embodiment, the probe 31 (detection unit) is allowed to be attached to or detached from the back plate 21 by moving the bridge portion 44d (second holding portion) from the first position P1 (restricting position) to the second position P2 (release position) in a state where the retainer 40 is held at a predetermined position on the back plate 21. According to this configuration, for example, the operator can easily attach or detach the probe 31 to or from the back plate 21 in a state where the retainer 40 has been attached to the back plate 21. Also, in the present embodiment, the second bent portion 44c and the third bent portion 44e curved in a curve shape are included as the operating portion. Accordingly, the operator is less likely to feel pain upon operation as compared with a sharp configuration.

Further, in the present embodiment, the retainer 40 has the movable arm 44, which is elastically deformable, and the movable arm 44 has the extension portion 44b positioned spaced from the second surface 21b of the back plate 21 and also extending toward the end portion 41b (the other end portion) of the base portion 41 along the base portion 41. According to this configuration, for example, it is possible to increase the length the movable arm 44. Accordingly, in the elastically deformed state as shown in FIGS. 9 and 11, an increase in the local stress on the movable arm 44 can be easily inhibited.

Further, in the present embodiment, the movable arm 44 has the bridge portion 44*d* configured to cross the end portion 41*b* of the base portion 41 in the direction X (thickness direction of the back plate 21) while being spaced from the end portion 41*b*. According to this configuration, for example, it is possible to increase the length the movable arm 44. Accordingly, in the elastically deformed state as shown in FIGS. 9 and 11, an increase in the local stress on the movable arm 44 can be easily inhibited.

Further, in the present embodiment, the base portion 41 has the protrusion 41*c* (stopper) for restricting movement of the movable arm 44 by abutting against the bridge portion 44*d* moving in accordance with movement of the movable arm 44. According to this configuration, for example, it is possible to inhibit an excessive movement of the movable arm 44. Accordingly, in the elastically deformed state as shown in FIG. 11, an increase in the local stress on the movable arm 44 can be easily inhibited.

Further, in the present embodiment, a part of the edge 44*g*1 of the opening portion 44*g* (first opening portion) provided in the bridge portion 44*d* is the abutting portion configured to abut against the protrusion 41*c* (stopper). According to this configuration, for example, the abutting portion can be realized by a relatively simple configuration. Also, for example, the stopper and the abutting portion are less likely to be displaced from each other, as compared with a case where the abutting portion is provided along a surface of the movable arm 44 or the bridge portion 44*d*. Therefore, the effect of the stopper can be obtained more reliably.

Further, in the present embodiment, the bridge portion 44*d* has the folded-back portion 44*f* and the third bent portion 44*e* (pressure receiving portion) configured to come in contact with the probe 31 moving toward the mounting position Ps thereof on the back plate 21 while the bridge portion 44*d* is positioned at the first position P1 and thereby to move the movable arm 44 so that the bridge portion 44*d* is moved from the first position P1 to the second position P2. According to this configuration, for example, the operator can easily mount the probe 31 onto the back plate 21 by causing the probe 31 to come close to the mounting position Ps and thus moving the bridge portion 44*d* from the first position P1 to the second position P2.

Further, in the present embodiment, the caliper 100 includes, for example, the brake fad 20 (brake pad assembly) with the probe 31 (sensor 30) and the retainer 40 mounted thereon, and the body 10 (support member) provided with the opening portion 13 (second opening portion) and configured to movably hold the brake pad 20. The second bent portion 44*c*, the bridge portion 44*d* or the folded-back portion 44*f* (operating portion) is provided to be operated via the opening portion 13 by the operator, and the probe 31 is provided to be attached or detached via the opening portion 13 by the operator. According to this configuration, for example, the operator can easily attach or detach the probe 31 to or from the back plate 21 via the opening portion 13.

Although the embodiments of the present invention have been illustrated in the foregoing, the embodiments are only examples and are not intended to limit the scope of the invention. The embodiments can be implemented in various other modes, and also various omissions, substitutions, combinations and changes therein can be made without departing from the spirit and scope of the invention. Also, configurations thereof or specifications, such as shape (structure, type, direction, shape, size, length, width, thickness, height, number, arrangement, position, material and the like) can be appropriately changed and implemented. For example, the mounting position or mounting direction of the probe 31 on the back plate 21 and the detailed configuration of the retainer 40 are not limited to the foregoing embodiments, and accordingly various modifications thereof can be made. Further, the configurations of the present invention are not limited to the opposing piston type caliper, but can also be applied to a floating type caliper.

The invention claimed is:

1. A brake pad assembly, comprising:
 a brake pad comprising a lining configured to come in contact with a slide surface of a disk rotor and a back plate having a first surface and a second surface opposite to the first surface, wherein the lining is fixed on the first surface;
 a detection unit attached to the back plate and configured to detect wear of the lining; and
 a retainer configured to detachably attach the detection unit to the back plate,
 the retainer comprising:
 a base portion in contact with the second surface;
 a first holding portion for holding the retainer at a predetermined position on the back plate;
 a second holding portion provided to be movable between a restricting position, at which the detection unit is restricted from being separated from the back plate, and a release position, at which the detection unit can be attached to or detached from the back plate;
 an urging portion for elastically urging the second holding portion from the release position toward the restricting position; and
 an operating portion configured to be moved by an external force applied thereon and thus to move the second holding portion from the restricting position to the release position,
 wherein the retainer has an elastically deformable movable arm that protrudes from one end portion of the base portion, has the second holding portion and the operating portion, and is configured to function as the urging portion,
 wherein the movable arm has an extension portion positioned spaced from the second surface and extending toward the other end portion of the base portion along the base portion,
 wherein the movable arm has a bridge portion configured to cross the other end portion of the base portion in a thickness direction of the back plate and spaced from the other end portion,
 wherein the base portion has a stopper for restricting movement of the movable arm by abutting against the bridge portion moving in accordance with movement of the movable arm.

2. The brake pad assembly according to claim 1, wherein a part of an edge of a first opening portion provided in the bridge portion is an abutting portion configured to abut against the stopper.

3. A brake pad assembly, comprising:
 a brake pad comprising a lining configured to come in contact with a slide surface of a disk rotor and a back plate having a first surface and a second surface opposite to the first surface, wherein the lining is fixed on the first surface;
 a detection unit attached to the back plate and configured to detect wear of the lining; and a retainer configured to detachably attach the detection unit to the back plate, the retainer comprising:

a base portion in contact with the second surface;

a first holding portion for holding the retainer at a predetermined position on the back plate;

a second holding portion provided to be movable between a restricting position, at which the detection unit is restricted from being separated from the back plate, and a release position, at which the detection unit can be attached to or detached from the back plate;

an urging portion for elastically urging the second holding portion from the release position toward the restricting position; and an operating portion configured to be moved by an external force applied thereon and thus to move the second holding portion from the restricting position to the release position, wherein the retainer has an elastically deformable movable arm that protrudes from one end portion of the base portion, has the second holding portion and the operating portion, and is configured to function as the urging portion, wherein the movable arm has an extension portion positioned spaced from the second surface and extending toward the other end portion of the base portion along the base portion, wherein the movable arm has a bridge portion configured to cross the other end portion of the base portion in a thickness direction of the back plate and spaced from the other end portion, wherein the bridge portion has a pressure receiving portion configured to come in contact with the detection unit moving toward a mounting position thereof on the back plate while the second holding portion is positioned at the restricting position and thereby to move the movable arm so that the second holding portion is moved from the restricting position to the release position, wherein the base portion has a stopper for restricting movement of the movable arm by abutting against the bridge portion moving in accordance with movement of the movable arm.

4. The brake pad assembly according to claim 3, wherein a part of an edge of a first opening portion provided in the bridge portion is an abutting portion configured to abut against the stopper.

5. A caliper, comprising:

a brake pad assembly, comprising:

a brake pad comprising a lining configured to come in contact with a slide surface of a disk rotor and a back plate having a first surface and a second surface opposite to the first surface, wherein the lining is fixed on the first surface;

a detection unit attached to the back plate and configured to detect wear of the lining; and a retainer configured to detachably attach the detection unit to the back plate, the retainer comprising:

a base portion in contact with the second surface;

a first holding portion for holding the retainer at a predetermined position on the back plate;

a second holding portion provided to be movable between a restricting position, at which the detection unit is restricted from being separated from the back plate, and a release position, at which the detection unit can be attached to or detached from the back plate;

an urging portion for elastically urging the second holding portion from the release position toward the restricting position; and an operating portion configured to be moved by an external force applied thereon and thus to move the second holding portion from the restricting position to the release position;

the caliper further comprising a support member provided with a second opening portion and configured to movably support the brake pad, wherein the operating portion is provided to be operated via the second opening portion, and the detection unit is provided to be attached or detached via the second opening portion, wherein the retainer has an elastically deformable movable arm that protrudes from one end portion of the base portion, has the second holding portion and the operating portion, and is configured to function as the urging portion, wherein the movable arm has an extension portion positioned spaced from the second surface and extending toward the other end portion of the base portion along the base portion, wherein the movable arm has a bridge portion configured to cross the other end portion of the base portion in a thickness direction of the back plate and spaced from the other end portion, wherein the base portion has a stopper for restricting movement of the movable arm by abutting against the bridge portion moving in accordance with movement of the movable arm.

6. The caliper according to claim 5, wherein a part of an edge of a first opening portion provided in the bridge portion is an abutting portion configured to abut against the stopper.

* * * * *